US006698918B2

(12) United States Patent
Durand

(10) Patent No.: US 6,698,918 B2
(45) Date of Patent: Mar. 2, 2004

(54) METHOD FOR FIXING JEWELS IN A WATCH MOVEMENT PART AND DEVICE FOR IMPLEMENTING THE SAME

(75) Inventor: Friedrich Durand, Solothurn (CH)

(73) Assignee: Eta SA Fabriques d'Ebauches (CH)

( * ) Notice: Subject to any disclaimer, the term of this patent is extended or adjusted under 35 U.S.C. 154(b) by 209 days.

(21) Appl. No.: 10/016,088

(22) Filed: Dec. 12, 2001

(65) Prior Publication Data

US 2002/0071349 A1 Jun. 13, 2002

(30) Foreign Application Priority Data

Dec. 13, 2000 (CH) .................................... 2000 2425/00

(51) Int. Cl.[7] ........................... G04B 29/00; B23P 5/00
(52) U.S. Cl. ........................... 368/324; 368/327; 29/10
(58) Field of Search ................................ 368/322, 324, 368/327; 29/10

(56) References Cited

U.S. PATENT DOCUMENTS

| | | | | |
|---|---|---|---|---|
| 4,866,823 A | * | 9/1989 | Magnien et al. | 29/10 |
| 5,475,910 A | * | 12/1995 | Yamamoto | 29/10 |

FOREIGN PATENT DOCUMENTS

| | | |
|---|---|---|
| CH | 384 473 A | 7/1964 |
| EP | 0 918 264 A | 5/1999 |
| FR | 2 662 965 A | 12/1991 |

* cited by examiner

*Primary Examiner*—Vit Miska
(74) *Attorney, Agent, or Firm*—Richard K. Robinson

(57) ABSTRACT

The method consists in using a setting device for jewel holes or prismatic jewels including at least a reference plane, on which the jewel to be fixed is wedged, said plane including at least spatial positioning means for said jewel, such as studs or cavities. Once the jewel is set in place, it is secured to its housing by applying a laser beam to its edge, possibly with the addition of a fusible material.

13 Claims, 2 Drawing Sheets

METHOD FOR FIXING JEWELS IN A WATCH MOVEMENT PART AND DEVICE FOR IMPLEMENTING THE SAME

The present invention concerns a method for setting and fixing jewels in parts of a watch movement, allowing both the relative positioning accuracy of the wheels to be increased and the cost price of the finished product to be reduced.

In high quality watch movements, in order to reduce friction and increase the longevity of the product, jewels or rubies are used essentially for the shoulders of the staffs of certain wheels, designated bearings, end-stones or cup-bearings, and as regards the escapement, for the entry and exit pallets of the lever escapement and for the impulse-pin. There currently exist different techniques for fixing these jewels in the appropriate places, such as the plate, bridge, escapement lever and roller plate, but the most common, it may be said since the beginning of the horological industry, consists in driving the jewel either into a setting, or more often directly into a housing machined in the part intended to receive said jewel. Tolerances both as regards the jewel and the housing have to be very low, of the order of $5\mu$, in order to prevent the jewel deforming the housing or conversely having any play during use. For bearings, it is also imperative to have perfect vertical positioning of the drilled hole, which is not necessarily obtained by driving in the jewels given that they generally have rounded edges. Likewise, precise positioning along the vertical axis is also necessary so that two facing bearings, or two facing end-stones respect the distance-of-centres provided for the wheels which they support, which requires precise machining both of the thickness of the jewel and of the bottom of the housing. Moreover, this requirement for accuracy is also necessary for the relative positioning of the drilled holes for the bearings arranged in a same plane and intended to receive gear-wheel pivots. This spatial positioning is also of very high importance as regards the escapement jewels, impulse pin and pallets, which are currently driven in and/or bonded. Driving in jewels inevitably causes a deformation in the roller-table which then has to be rectified by diamond polishing and bonding also necessitates a machining operation in order to remove the surplus of the adhesive material used.

In order not to be tied to such a high level of accuracy and to avoid the drawbacks of driving in the jewels, Swiss Patent No. 384 473 proposes a cam device allowing an end-stone to be wedged in two hollows in the wall of the housing. The device disclosed in Swiss Patent No. 362 286 proposes a similar device formed by a bayonet assembly device. Other devices propose means for wedging a jewel via elastic rings locking into grooves in the wall of the recess. It is clear that such devices permit lower tolerance requirements as regards machining the jewel and the housing, but they are not entirely satisfactory as regards the spatial positioning of the jewels and securing them to their support.

As regards the machines or robots which set and secure the jewels, to the best of the Applicant's knowledge, these are driving techniques such as those disclosed for example in Swiss Patent Nos. 378 242 and 417 479.

The object of the present invention is to overcome the drawbacks of the aforecited prior art by transferring the requirement for accuracy to a setting device and relying on laser technology to secure the jewels in their housing.

The invention thus concerns a method allowing jewels to be secured in parts of a watch movement by laser beam by means of a setting device. "Parts" means the fixed parts of a watch movement, such as the plates and bridges, or the moving parts such as the escapement, the jewels then being designated bearings, end-stones, impulse pins or pallet-stones. These jewels are obtained synthetically, from a fine alumina powder and machined essentially by diamond polishing to make them at the dimensions of the housing in which they are currently secured by being driven therein. The method according to the invention consists however, in using a setting device very precisely, with respect to a reference surface of the part wedged onto the setting device, the spatial position of the jewel with respect to its housing whose machining tolerances will therefore be able to be much less strict.

The method consists in:

a) providing the setting device with spatial positioning means for one or several jewels with respect to one or several reference planes of said setting device and means for wedging a part, b) wedging the part in which the jewel is to be set on the setting device, c) putting one or several jewels in the respective housings securing their spatial position in the part with the positioning means of the setting device, d) focusing and moving a laser beam tip on the points of abutment of the jewel against the wall of a housing, on the periphery of the opening of a housing or on a fusible material added around said opening so as to secure the jewel to the housing, and e) releasing and removing the part from the setting device.

When the jewels are intended for pivoting wheels, and in particular when they are jewel holes, otherwise designated "bearings", the positioning means are formed by studs anchored in the surface of the setting device and passing through a through passage provided at the bottom of the housing. The diameter of the distal part of the stud is substantially equal to the diameter of the hole of the bearing. The part anchored in the setting device may have the same diameter than the distal part, the jewel resting on the bottom of the housing which then will have to be machined to a very precise dimension. The part of the stud anchored can also have a larger diameter than the distal part allowing a shoulder to be provided for vertically positioning the jewel with respect to the reference surface of the part, independently of the accuracy of manufacture of the bottom.

For prismatic jewels, such as escapement pallets or escapement impulse-pins, the setting device includes positioning means which are reversed with respect to those previously cited, namely cavities arranged in the surface of the setting device and in which the jewels can be temporarily immobilised with great precision by locking means, such as locking screws or spring pins.

Depending on the shape of the parts in which the jewels are to be set, it may be necessary to provide a setting device with several levels.

Of course, the spatial positioning accuracy of the jewels also depends on the wedging accuracy of the jewel, such accuracy can be obtained for example by means of stops arranged on an edge of the part, or by means of studs passing through it, these wedging means being mounted with precision on the setting device.

As will be indicated in more detail in the following examples, once the jewel has been positioned, it is definitively secured in the housing by means of a laser beam allowing the jewel to be welded to the wall, or the small play existing between the outer edge of the jewel and the wall to be filled either by melting an edge above the opening, in a single piece with the part, or by melting an added fusible material.

Other features and advantages of the present invention will appear more clearly upon reading the following detailed description of implementation examples of the method, given purely by way of non-limiting illustration, with reference to the annexed drawings, in which.

Figure 3A:
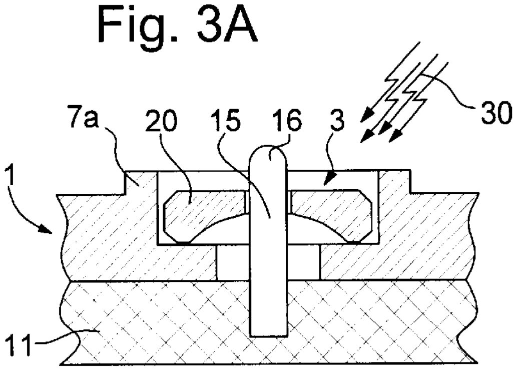
FIGS. 3A and 3B shows schematic cross-sections of the setting of a bearing according to a second embodiment.
Figure 3B:
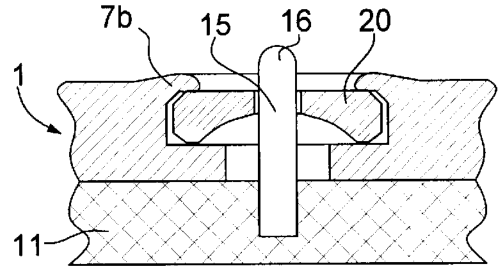
Figure 4A:
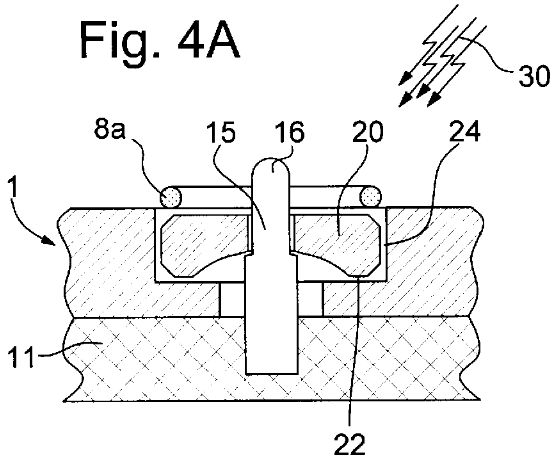
FIGS. 4A and 4B show schematic cross-sections of the setting of a bearing according to third embodiment.
Figure 4B:
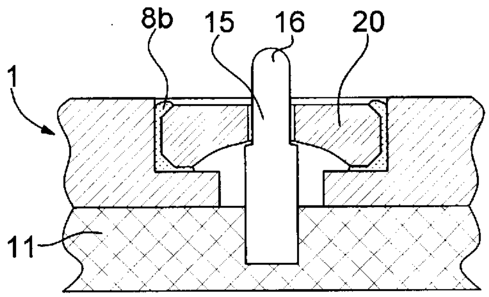
Figure 5:
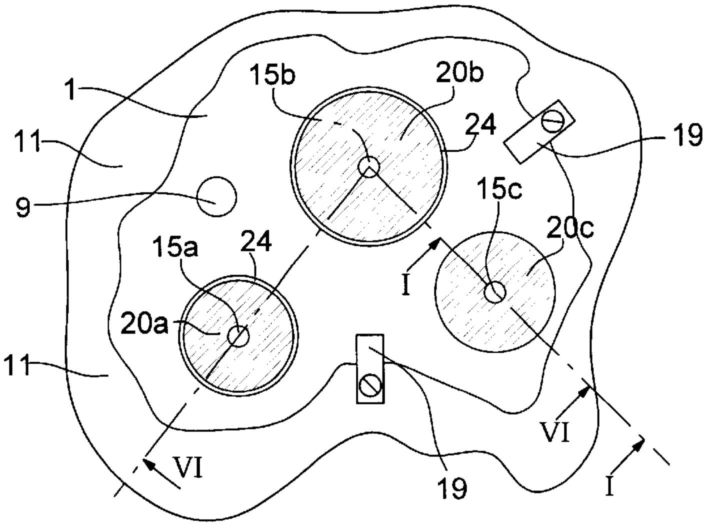
FIG. 5 is a top view of a setting for a part having three bearings.

FIGS. 1 to 4B show a cross-section along the line I—I of FIG. 5 of several embodiments of the method according to the invention for fixing or setting a jewel hole 20, more generally designated a "bearing" in a part 1 of a watch movement, such as a plate or a bridge. In all the Figures, dimensions have been greatly exaggerated, given that the diameter of a bearing is of the order of a millimeter and relative dimensions have not necessarily been respected in order to make the drawings clearer.

Figure 1:
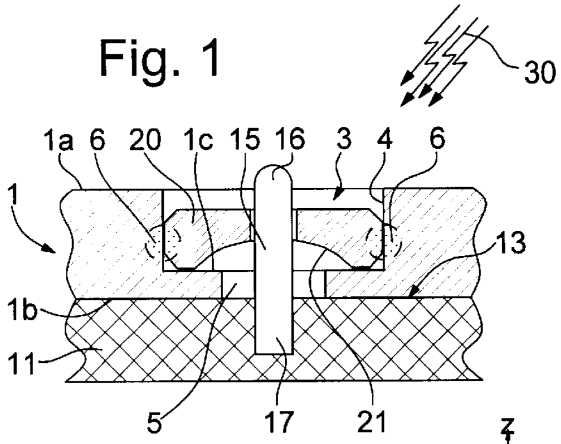
FIG. 1 shows a schematic cross-section of the setting of a bearing according to a first embodiment.
Figure 2:
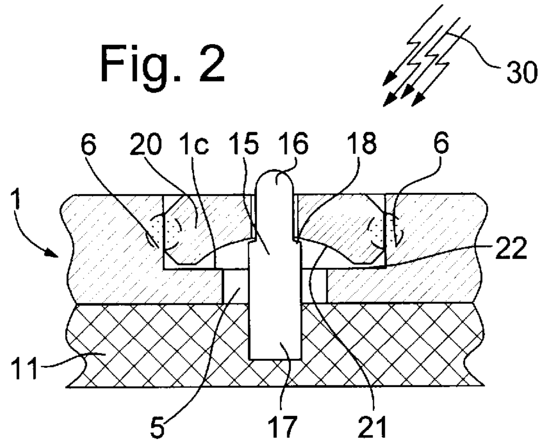
FIG. 2 shows a variant of the setting shown in FIG. 1.
Figure 2:
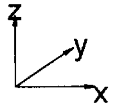
Figure 6:
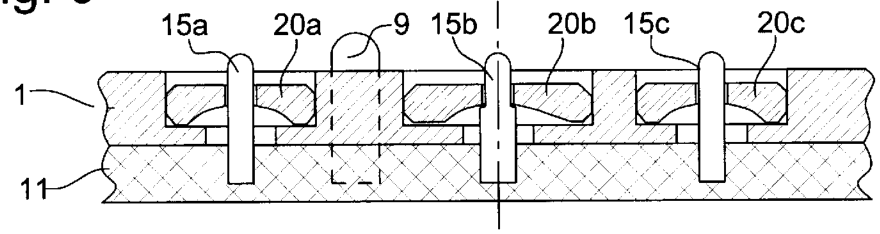
FIG. 6 shows the cross-section along the line VI—VI of FIG. 5.

With reference first of all to FIGS. 1 and 2, it can be seen that part 1 includes in its upper face 1*a* a housing 3 delimited by a wall 4 and the bottom of which includes a through passage 5 joining lower face 1*b*. The diameter of this through passage is generally much greater than the drilled hole of bearing 20 to give access to an oil sink 21. Part 1 is placed on a setting device including a base 11 whose perfectly polished upper surface forms a reference plane 13 for the horizontal x, y co-ordinates. Reference plane 13 includes at least a stud 15 the lower part 17 of which is anchored in base 11, as shown, or it can be in one piece with said base 11. Distal part 16 of stud 15 extends at least as far as upper face 1*a* of part 1 and its diameter is substantially equal to the drilled hole of bearing 20 which has to be placed in the housing, i.e. ideally with no play allowing a movement of translation of the stud in the drilled hole. Reference plane 13 also includes means for wedging part 1 in the x, y referential, these means being for example stops 19 or a stud 9, as shown in FIG. 6. Bearings 20 are then threaded onto studs 15 and placed in their respective housings 3, with a slide fit, i.e. with a fit which would be insufficient in itself to guarantee sufficient hold for use. In the corresponding embodiments of FIGS. 1 and 2, studs 15 thus allow the relative position of bearings 20 to be fixed in reference plane 13 with respect to the wedging of part 1 on the setting device, and also with respect to each other, as shown in the schematic view of FIG. 5. FIG. 5 shows, by way of example, a top view of a setting device 11 supporting a part 1 including three bearings 20*a*, 20*b*, 20*c*, positioned very precisely in the x, y plane by studs 15*a*, 15*b*, 15*c* while being able to have a certain lateral play 24 with respect to wall 4 of housing 3, as shown for example in FIGS. 4A and 4B.

In the embodiment shown in FIG. 1, spatial positioning along the vertical axis z is obtained via the manufacturing accuracy of the flange 1*c* of the bottom of housing 3, on which the outer shoulder of jewel 20 rests and via the manufacturing accuracy of the jewel thickness.

In the embodiment shown in FIG. 2, spatial positioning along vertical axis z is obtained via a shoulder 18 of stud 16 located between its part 17 anchored in base 11 and its distal part 16. As can be seen, bearing 20 is positioned with sliding friction in housing 3 possibly leaving a free space 22 between flange 1*c* and the bottom of bearing 20. Thus, in this embodiment, the spatial referential for bearings 20 is formed solely by the setting device.

Once bearings 20 have been set in place with sliding friction in part 1, the contour of the opening is traced by a laser beam so as to create a melting zone 6 between the edge of bearing 20 and wall 4 of housing 3.

In a known manner, the watch movement "part" plate or bridge, is generally of metal, such as brass, or steel and the jewel is a synthetic stone cut from a cylinder of corundum. According to a preferred embodiment, in order to increase the cohesion between these two categories of material, a deposition of titanium dioxide is made beforehand on wall 4 of housing 3, for example by using chemical vapour deposition (CVD) technology.

Once the jewels are secured to the part, one need only remove the part from the setting device, all the accuracy requirements as regards the position of the bearings being in a way transferred from the setting device to the part. Of course, this method enables the same setting device to be used to set jewels in a large number of parts, which allows the unit cost of the parts to be reduced, given that it is no longer necessary to machine them individually with great accuracy.

In the embodiment of the method shown in FIGS. 3A and 3B, the setting device is the same as that shown in FIG. 1. However, it can be seen in FIG. 3A that the periphery of housing 3 includes an edge 7*a* integral with part 1, this edge 7*a* may be continuous as shown, or discontinuous. After laser beam 30 has been applied, edge 7*a* is bent down towards the centre of housing 3 to form a raised portion 7*b* which holds bearing 20 at the bottom of housing 3. FIGS. 4A and 4B show an embodiment wherein the setting device is the same as that shown in FIG. 2, but differs from it in that bearing 20 is positioned solely by stud 15 by arranging a small space 22 between the bottom of housing 3 and another space 24 between the wall. In other words, these spaces 22, 24 allow very wide tolerances to be obtained for the manufacture of housing 3 and for the manufacture of bearing 20. Bearing 20 is immobilised in housing 3 by adding a cord 8 of fusible material onto the periphery, such as silver or a silver and lead, tin or indium based composition. When laser beam 30 is applied, fusible material 8 forms a mass 8*b* which infiltrates spaces 22, 24 and locks bearing 20 in the spatial position determined by stud 15.

The top view of FIG. 5 and the cross-section of FIG. 6 show by way of example a portion of part 1 including three bearings 20*a*, 20*b*, 20*c*, the relative positioning of whose pivoting holes is determined by three studs 15*a*, 15*b*, 15*c* anchored in base 11 of the setting device. It can also be seen that part 1 is wedged on the setting device by means of a stud 9, anchored in base 11, and two steps 19, these wedging means being given by way of example, since it is obviously possible to envisage other equivalent ones.

Figure 7:
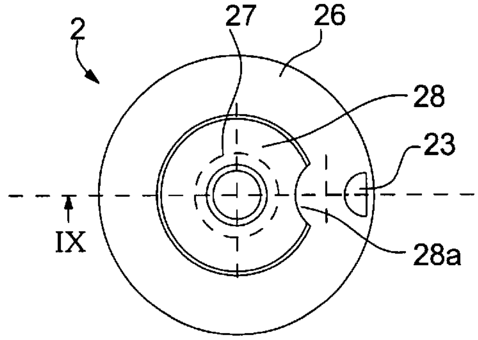
FIG. 7 shows a bottom view of an escapement roller-table.
Figure 8:
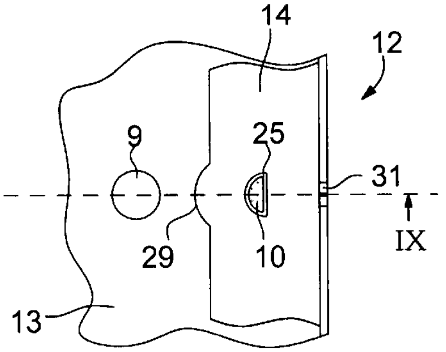
FIG. 8 shows a top view of the setting device for the escapement roller-table shown in FIG. 7.
Figure 9:
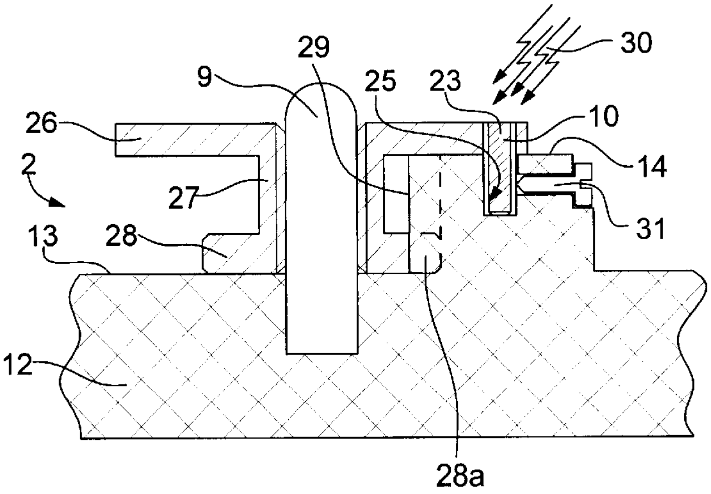
FIG. 9 shows a cross-section along the line IX—IX of FIGS. 7 and 8 of a setting device according to the invention for the escapement impulse-pin.

FIGS. 7 to 9 show an embodiment of the method wherein the setting device allows an impulse pin of an escapement roller-table to be fixed.

FIG. 7 shows a bottom view of such a roller-table 2 which includes in a known manner a large roller plate 26, having close to its edge and perpendicular to its plane, a housing 23 which passes right through it to accommodate an impulse pin 10 (not shown), joined by a sleeve 27 to a small roller-table 28 provided with a notch 28*a*.

FIG. 8 shows a top view of setting device 12 the structure of which will be better understood with reference also to FIG. 9 which shows a cross-section along the line IX—IX of FIGS. 7 and 8, escapement roller-table plate 2 set in place on setting device 12. This device includes a first reference plane 13, provided with a stud 9 which passes through sleeve 27, reference plane 13 acting as a support for the base of small roller-table 28. The setting device also includes a second reference plane 14, parallel to plane 13, at a level corresponding to the distance which separates the base from small roller-table 28 and the lower surface of large roller-table 26. The wall which joins the two reference planes 13, 14 includes a raised portion 29 having the same shape as notch 28*a* and forming with stud 9 the means for wedging escapement roller-table 2. Of course, other wedging means may be envisaged. The second reference plane 14 includes a cavity 25 intended to accommodate and position a jewel forming the impulse pin. In the example shown, half-moon shaped jewel 10, temporarily immobilised by means of a locking screw 31 of parallel axis to reference planes 13, 14. Once jewel 10 has been immobilised spatially on the setting device, one need only set escapement roller-table 2 in place and secure jewel 10 by laser beam according to one of the previously indicated embodiments. Since jewel 10 is mounted with play or sliding friction, no mechanical stress is imposed on the very thin external wall of housing 23, so that no subsequent machining is necessary. The driving in technique would have produced a deformation of the edge of the large roller-table at the location of the housing so that it would have been necessary to perform a diamond polishing operation which eventually leads to at least 50% of the parts being discarded. The method according to the invention saves a machining operation and allows a greater percentage of conforming parts to be produced.

By adapting the method which has just been described for an escapement roller-table, those skilled in the art can design without any difficulty a device for setting and fixing pallet stones by means of a laser beam.

What is claimed is:

1. A method for fixing jewels in parts of a watch movement by laser beam by means of a setting device, said parts being provided in the upper surface with at least a housing whose wall delimits an opening having a contour fitted with a slight play to the contour of the jewel to be fixed and whose bottom is provided, at least partially with a through passage joining an opening in the lower surface, wherein it includes the steps of:

a) providing the setting device with spatial positioning means for one or several jewels with respect to one or several reference planes of said setting device and means for wedging a part, b) wedging the part in which the jewel is to be set on the setting device, c) setting one or several jewels in the respective housings securing their spatial position in the part with the positioning means of the setting device, d) focusing and moving a laser beam tip on the points of abutment of the jewel against the wall of a housing, on the periphery of the opening of a housing or on a fusible material added around said opening so as to secure the jewel to the housing, and e) releasing and removing the part from the setting device.

2. A method according to claim 1 for fixing bearings, wherein the spatial positioning means are formed by studs anchored in a reference plane of the setting device which pass through the through passage of the bottom of the housing and whose distal part has a diameter substantially equal to the pierced diameter of said bearings.

3. A method according to claim 2, wherein the diameter of the stud part anchored in the setting device is greater than that of the distal part to form a shoulder above the bottom of a housing.

4. A method according to claim 1 for fixing jewels having no holes, wherein the spatial positioning means are formed by cavities in a reference surface of the setting device intended to accommodate jewels which are temporarily immobilised in said cavities by locking means such as locking screws.

5. A method according to claim 1, wherein the means for wedging a part on the setting device are formed by stops or studs passing through the part.

6. A method according to any of the preceding claims, wherein the jewel spatial positioning means and the part wedging means are arranged in at least two different reference planes of the setting device.

7. A method according to claim 1, wherein the jewel has a slide friction fit in its housing, wherein, prior to the application of the laser beam, the wall of the housing is treated to have a thin coating of titanium dioxide.

8. A method according to claim 7, wherein the titanium dioxide coating is formed by chemical vapour deposition (CVD).

9. A method according to claim 1, wherein the contour of the opening of a housing includes an edge which has to be bent down into the opening by applying a laser beam.

10. A method according to claim 1, wherein the fusible material added around the opening of a housing is silver or a silver-based compound.

11. A method for fixing jewels in housings arranged in a watch movement part, said housings including through passages, and said fixing being effected by means of laser beams, wherein it includes a setting device formed by at least a reference plane on which the part rests, spatial positioning means for the jewels and means for wedging said part.

12. A device according to claim 11, for fixing bearings, wherein the spatial positioning means are formed by studs anchored in a reference plane of the setting device which pass through the through passage of the bottom of the housing and whose distal part has a diameter substantially equal to the pierced diameter of said bearings.

13. A device according to claim 11, for fixing jewels having no holes wherein the spatial positioning means are formed by cavities in a reference surface of the setting device intended to accommodate jewels which are temporarily immobilised in said cavities by locking means such as locking screws.

* * * * *